A. A. DAUGHERTY.
VEHICLE WHEEL.
APPLICATION FILED JAN. 5, 1907.
902,383.
Patented Oct. 27, 1908.
2 SHEETS—SHEET 1.
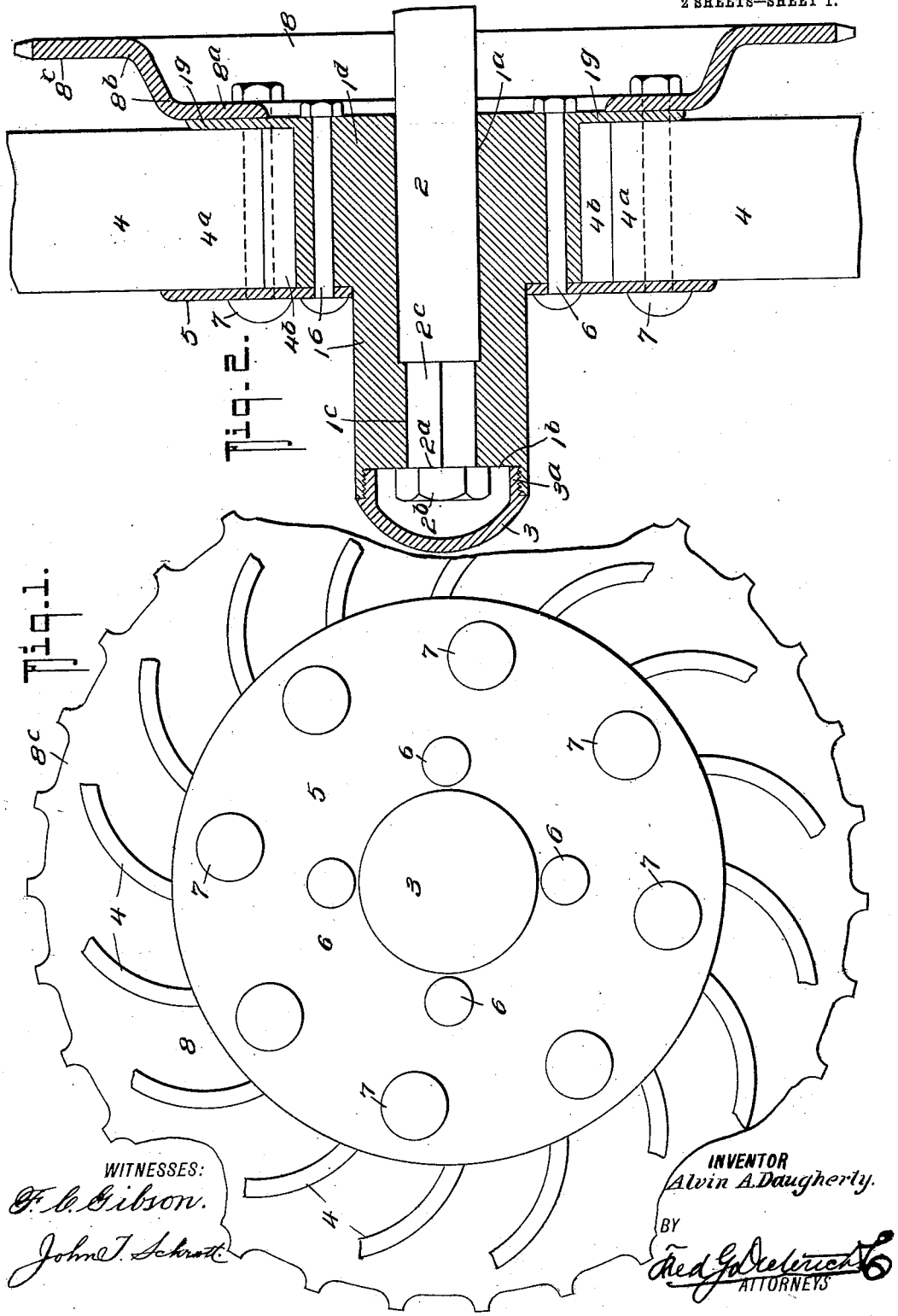
WITNESSES:
F. C. Gibson.
John T. Schrott.
INVENTOR
Alvin A. Daugherty.
BY
Fred G. Dieterich
ATTORNEYS
THE NORRIS PETERS CO., WASHINGTON, D. C.

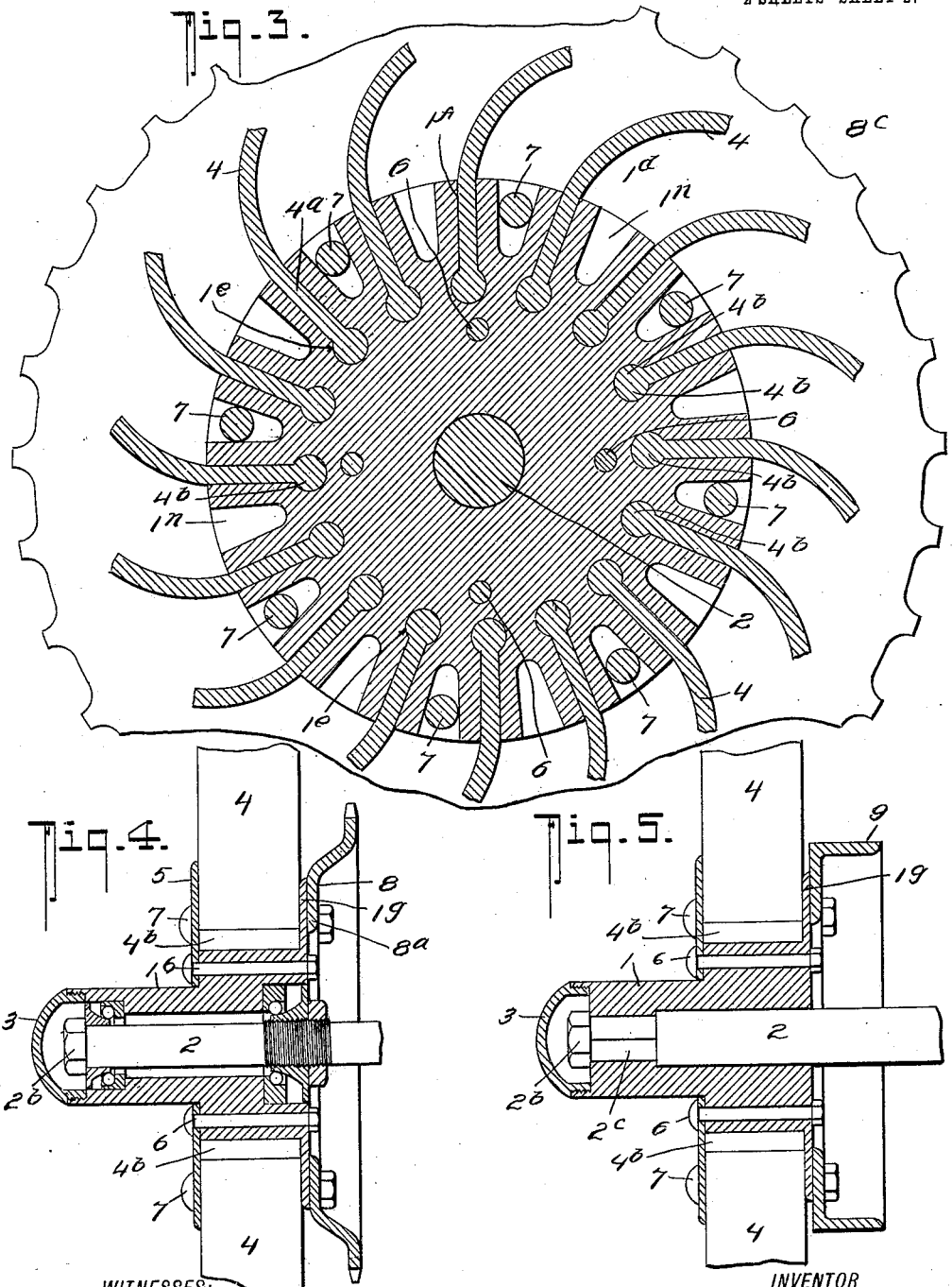

UNITED STATES PATENT OFFICE.

ALVIN ALEXANDER DAUGHERTY, OF NEW YORK, N. Y.

VEHICLE-WHEEL.

No. 902,383.  Specification of Letters Patent.  Patented Oct. 27, 1908.

Application filed January 5, 1907. Serial No. 351,023.

*To all whom it may concern:*

Be it known that I, ALVIN A. DAUGHERTY, residing at New York, in the county of New York and State of New York, have invented certain new and useful Improvements in Vehicle-Wheels, of which the following is a specification.

My invention relates to certain new and useful improvements in vehicle wheels, and it more particularly relates to improvements in the hub structure of the wheels of the type disclosed in my co-pending application filed on even date herewith and in my Patent #849,373, granted Apr. 9, 1907.

Generically, the invention comprises a wheel having resilient spokes and a hub of a particular construction for receiving and securing the spoke ends in place.

Primarily, the invention has for its object to provide a hub of a very simple and effective construction which can be easily and cheaply manufactured, and which when used in connection with the spoke construction disclosed in my co-pending applications hereinbefore referred to, will result in the production of a wheel of an exceedingly durable and efficient nature that will readily and effectively serve its intended purposes.

In this application I make no specific claim to the special construction of spokes and means for securing the spokes to the wheel rim or tire since that forms the subject-matter of my co-pending application filed on even date herewith and hereinbefore referred to.

In its more subordinate features the present invention embodies certain novel construction, combination and design of parts, all of which will be first described in detail and then be specifically pointed out in the appended claims, reference being had to the accompanying drawings, in which:—

Figure 1, is a side elevation of a hub embodying my invention, the spoke ends being shown in the drawings. Fig. 2, is a central, transverse, vertical section thereof, the spoke ends being shown in elevation. Fig. 3, is a central, vertical, longitudinal section of the hub. Fig. 4, is a vertical, transverse section showing a modified form of my invention. Fig. 5, is a similar view of another modification of my invention.

Referring now to the accompanying drawings, in which like letters and numerals of reference indicate like parts in all of the figures, 1 represents the hub barrel which has a central aperture $1^a$ to receive the shaft 2. The hub barrel 1 is countersunk at the end as at $1^b$ and internally threaded to receive the threaded end $3^a$ of a dust cap 3, while the shaft 2 is held in place, when it is desired that the shaft turn with the wheel, by forming the barrel 1 with a portion $1^c$ to fit on the reduced portion $2^c$ of the shaft, and by threading the end $2^a$ of the shaft to receive a nut $2^b$ held within the cap 3.

To cause the shaft and the wheel to turn together, the reduced portion $2^c$ of the shaft 2 is squared in cross section as is also the corresponding portion of the bore of the hub barrel 1. The hub also includes a spoke receiving body portion $1^d$ which is bored from one side face at suitable intervals as at $1^e$ to form cylindrical chambers. With the chambers $1^e$ rectangular slots $1^f$ merge and the slots $1^f$ extend radially outward. The bores $1^e$ and the slots $1^f$, however, do not extend entirely through the body portion $1^d$, but terminate in a wall $1^g$, as shown.

4 designtes the spokes whose end portions $4^a$ lie in the slots $1^f$ and terminate in cylindrical heads $4^b$ which lie in the bores $1^e$, as shown.

In order to hold the spokes in the hub slots, I place a plate 5 over the open face of the body portion $1^d$ and secure the same in position by bolts 6 passing through apertures in the body portion of the hub and the plate 5.

The body portion $1^d$ between the slots $1^f$, has peripheral pockets $1^n$ in which supplemental securing bolts 7 are held and these bolts pass through the plate 5 and the web or wall $1^g$ and also through the web $8^a$ of a sprocket 8 which is dished or off-set as at $8^b$ to space the sprocket rim $8^c$ away from the wheel spokes the required distance.

Instead of securing the shaft and hub to turn together the wheel hub and the shaft may be provided with anti-friction bearings, such for instance, as are shown in Fig. 4, and when desired the sprocket 8 may be omitted, or a pulley 9 for brake purposes or otherwise, may be substituted therefor, as shown in Fig. 5.

From the foregoing description taken in connection with the accompanying drawings it is thought the complete construction, operation and many advantages of my improved type of hub can be readily understood by those skilled in the art to which the invention appertains, and I desire to say that this particular hub may be used with any type of wheel and is not limited in its use to the particular type of wheel disclosed in my co-pending applications hereinbefore referred to, although it is principally designed for such use.

What I claim is:—

In a vehicle wheel, a series of flat spokes, a hub therefor, said hub having pockets and slots merging therewith, said spokes having their ends provided with cylindrical heads to fit in said pockets, with the spokes projecting through said slots, means for holding said spokes in the slots and pockets, said means comprising a web integrally formed with the hub, a plate removably secured to the hub over the spoke ends, said hub having slotted portions between the spoke slots, and bolts passing through said last named slotted portions and the plate, for securing the plate in position.

ALVIN ALEXANDER DAUGHERTY.

Witnesses:
A. E. DIETERICH,
MAY E. IMMICH.